July 8, 1958 D. C. GREEN 2,841,984
CONNECTION FOR FLUID PRESSURE OPERATED DEVICES
Filed May 6, 1953 2 Sheets-Sheet 2

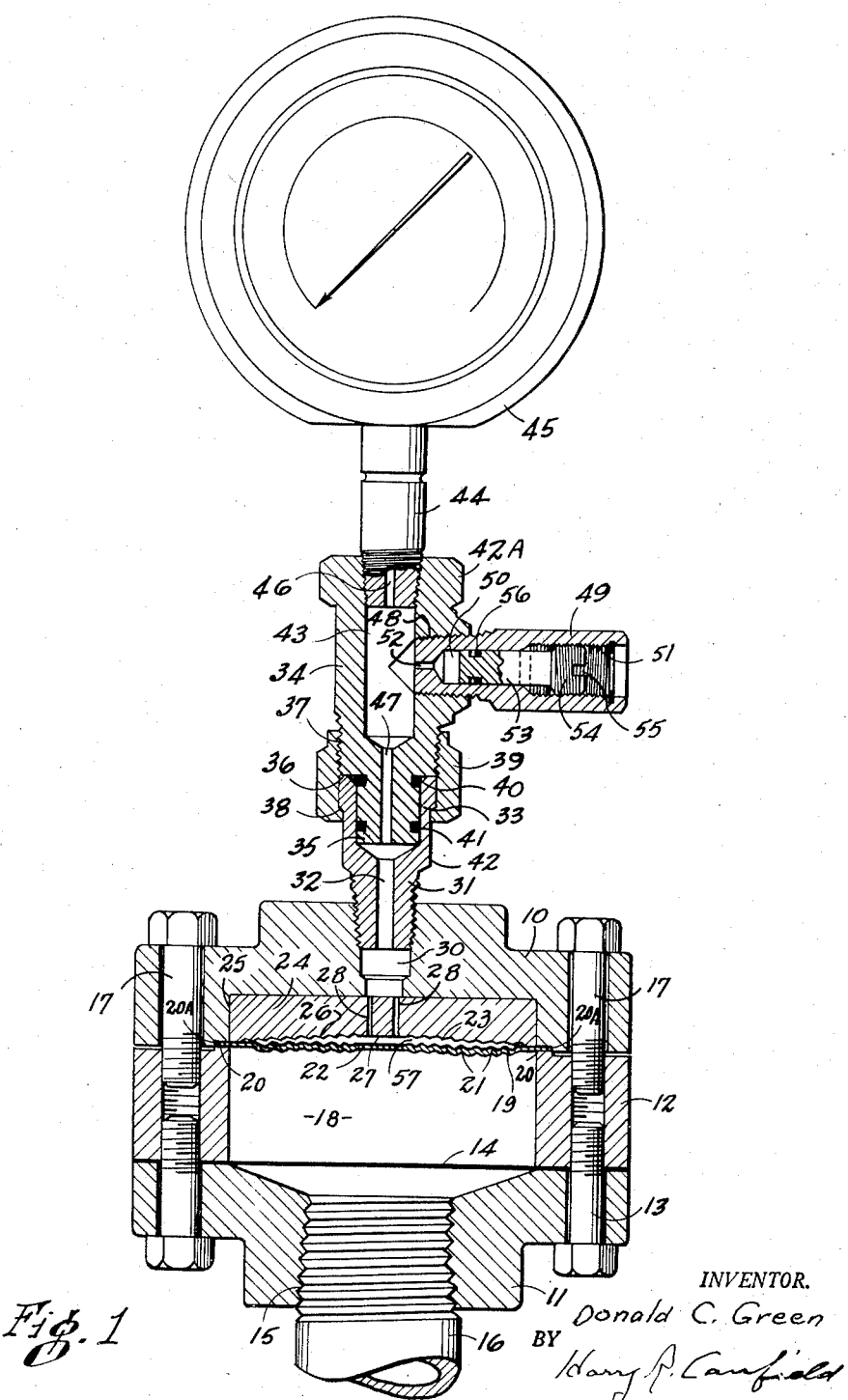

INVENTOR.
Donald C. Green
BY
*Harry P. Canfield*
ATTORNEY

United States Patent Office 2,841,984
Patented July 8, 1958

2,841,984

CONNECTION FOR FLUID PRESSURE OPERATED DEVICES

Donald C. Green, Russell, Ohio

Application May 6, 1953, Serial No. 353,341

3 Claims. (Cl. 73—395)

This invention relates to connections for communicating the fluid pressure of conduit lines, apparatus etc. to fluid pressure operated devices.

While the invention is applicable to different classes of pressure operated devices in the various arts, it has been chosen to illustrate and describe it herein as applied to pressure indicating gages, that being one of its important commercial fields; but it is to be understood that the invention is not limited to pressure gages.

Prior connections for the stated purpose have comprised a closed walled housing divided into two chambers by a flexible diaphragm, the housing being in two parts clamped upon the periphery of the diaphragm by bolts, etc., and the gage is mounted on one part in communication with with one chamber, herein called a "gage chamber," and a fluid conduit subjected to the pressure of the fluid to be indicated, is mounted on the other part in communication with the other chamber, herein called "pressure chamber."

The gage, for example a Bourdon tube gage, as generally utilized, is by this means isolated from the fluid in the pressure chamber, and the gage may be filled with one kind of liquid, chosen to be best for the gage, and different from the fluid to be pressure-indicated, which latter may be of various kinds, liquid, or gas, and may, for example, be corrosive, which if not isolated from the gage as aforesaid, would damage it. A suitable gage liquid is glycerine and water.

The pressure in the pressure chamber on one side of the diaphragm is opposed by the pressure on the other side in the gage chamber and gage.

The diaphragm is flexed by the applied pressure and displaces liquid from the gage chamber into the gage.

Such diaphragms have been made of various materials, thin sheet metal having been found generally preferable, and the metal being one chosen to resist corrosion or other deleterious effects of the liquid in the pressure chamber.

To render such metal diaphragms more flexible and more sensitively responsive to changes of applied fluid pressure and less liable to become distorted, they have been made circular and generally planar, but with circular, concentric corrugations press formed therein.

The gages are generally provided with a threaded tubular stem screwed into the gage chamber wall.

It has been found necessary to remove the gage from time to time.

This may become necessary after a period of use, to clean or repair the gage or to replace it if it has deteriorated from use; or to test it for accuracy from time to time.

When the pressure to be indicated by the gage is that associated with some kind of discontinuous batch process, this may be readily done by simply unscrewing and removing the gage between batches, after the applied pressure is cut off; but in cases in which the pressure in the pressure chamber is continuously maintained, the gage cannot be removed because that would expose the applied pressure side of the diaphragm to the full unopposed applied pressure, and in many instances when this has been inadvertently done, the pressure has permanently distorted the diaphragm so that thereafter it does not flex in correspondence with the pressure and the gage indications are unreliable. In other instances the applied pressure has ruptured the diaphragm.

When the gage is a Bourdon tube gage, the gage tube may crack or otherwise develop a leak. This relieves the pressure in the gage chamber, and the applied pressure, then unopposed, ruptures the diaphragm. The fluid in the applied pressure chamber then flows through the ruptured diaphragm, into the tube, and out at its break; and if the fluid in the applied pressure chamber is corrosive, corrosive fluid displaces the chosen liquid in the tube, and is discharged or leaks or is sprayed out of the tube leak into the gage mechanism or out of the gage as a whole. This has heretofore wrought material damage, and sometimes actual injury to nearby attendants.

In some cases, it has been attempted to prevent accidental rupture of the diaphragm as aforesaid, by having a surface of the wall of the gage chamber into which the gage is screwed, directly over and close to the diaphragm, leaving only enough space therebetween for the diaphragm to flex its maximum. Upon the tendency to flex more than maximum and possibly to rupture as aforesaid, the diaphragm is stopped upon the said surface. But this introduces other disadvantages as follows.

The gage stem generally opens into the gage chamber at a point opposite the flexible portion of the diaphragm, and the said unopposed applied pressure may rupture the diaphragm by forcing a part of it into the stem end, or into the hole in which the stem is screwed.

Also, when the diaphragm is corrugated as aforesaid, and even if it does not rupture, the said unopposed applied pressure will mash the corrugations upon said wall surface and destroy their function and so distort the diaphragm as to render it useless.

The metal of the diaphragm even if very thin and corrugated will have some resilience or spring action when flexed beyond a minimum amount and this will be reflected in inaccurate gage readings unless the flexure be limited to the minimum. The quantity of gage liquid in the gage chamber must therefore be of an accurately predetermined amount to predetermine a normal neutral or unflexed condition of the diaphragm before pressure is applied, in order for the gage to read correctly; and in prior arrangements, this has been difficult if not impracticable, to effect.

Also, in prior arrangements when the gage stem has been screwed in tight to be leak proof, the dial of the gage may face in the wrong direction, and the gage cannot be turned back to face as wanted, without loosening the threaded connection and rendering it liable to leak.

Because of the defects and disadvantages of prior connections, some of which are mentioned above, the primary object of the present invention is to provide generally an improved connection of the class referred to; and particularly, one that obviates these and other objections.

The invention comprises in general a two chamber housing and corrugated diaphragm clamped therebetween.

Concentric recesses are provided in a concave wall surface of the gage chamber opposite to and adjacent to the gage chamber face of the diaphragm, with which the corrugations of the diaphragm in its clamped position may exactly mate, when flexed the maximum; and the concavity of the wall surface is predetermined to limit the maximum flexure to a predetermined amount.

Communication of the liquid in the tubular gage stem with the interior of the gage chamber is through elongated ducts of capillary size.

By these means the gage may be removed as aforesaid, whenever desired, and even if there is then great unopposed liquid pressure on the diaphragm in the pressure chamber, the diaphragm cannot be ruptured or damaged thereby, because the corrugations of the diaphragm move into the mating recesses and are stopped and backed up thereby when the diaphragm has flexed its maximum predetermined amount; and the capillary ducts are too small for the diaphragm to be forced into them and injured or ruptured.

The said concentric recesses are preferably on a die cast insert fitted in the wall of the gage chamber, and the capillary ducts go through the insert; whereby accurate manufacture is facilitated.

The said ducts because of their capillary size, may be utilized to retain in the gage chamber a solid filling of gage liquid when the housing is assembled in manufacture, and to this end vacuum may be applied to the ducts and gage chamber to exhaust contained air to facilitate such filling; and to insure that the air will all be exhausted and none trapped in the concentric recesses near the diaphragm, thin radial slits are provided, communicating between the recesses and the capillary ducts; and the slits, like the ducts, are so small transversely that the diaphragm cannot be forced into them and be ruptured or distorted by applied fluid pressure, when the gage is removed as aforesaid. The slits also insure that the corrugations in the wall will fill with gage liquid.

The threaded gage stem may be of standard outside pipe thread diameter and the gage-chamber wall may have a threaded hole through it into which it may be screwed.

The interior of the gage stem at its outer screwed-in end may be made of capillary size and thereby retain in the gage and stem a solid, air free, filling of gage liquid.

At the time of screwing in the gage stem, the diaphragm is first flexed into mating engagement with the said concave wall surface, preferably by applying air pressure in the pressure chamber on the other side of the diaphragm, and then an exhausting and liquid filling operation performed as aforesaid. The threaded hole is then filled with gage liquid up to a predetermined measured level, communicating with the aforesaid solid filling of liquid in the gage chamber and capillary ducts and slits. When the gage stem is screwed in, it lowers the level of gage liquid in the threaded hole, displacing it into the gage chamber, and the air pressure flexing the diaphragm is relieved.

The diaphragm then returns to an unflexed normal or neutral condition for use. The quantity of liquid thus displaced into the gage chamber by the gage stem being preferably predetermined so as not to flex the diaphragm beyond its neutral normal condition, by measuring the level of liquid provided in the threaded hole as aforesaid.

Measurement of the liquid level as aforesaid to predetermine the amount of gage liquid displaced into the gage chamber for the said purposes of positioning the diaphragm for use, is sufficiently accurate for many instances.

When greater accuracy is wanted provision is made by the addition of other parts between the gage chamber and the gage, which during assembly thereof automatically and accurately displaces the necessary amount of liquid into the gage chamber.

Provision is also made, by means of a sealed coupling between the gage and the gage chamber, by which the dial of the gage may be turned to face in any desired direction without disturbing the liquid tight connection between the gage and the gage chamber.

Provision is made for cleaning out the applied pressure chamber, which may accumulate material from the applied liquid, without disturbing the clamped position of the diaphragm, in which the corrugations and recesses are in position to mutually mate as aforesaid.

At higher and higher values of applied pressure to be indicated, the diaphragm flexes more and more and displaces gage liquid from the gage-chamber into the gage, to effect pressure indications. In some cases the diaphragm because of its diameter etc. may not be flexed enough to make contact with said concave wall surface, when the gage is indicating its maximum scale reading. In such cases, if a higher pressure than the maximum gage indicating pressure should occur in the applied pressure chamber, the diaphragm would be flexed still more and force the gage beyond its maximum indicating condition and damage the gage.

For such instances the provision is made to arbitrarily and adjustably subtract liquid from the gage chamber until the diaphragm is flexed into contact with the said concave wall surface, when the pressure in the applied pressure chamber is at said gage maximum.

Thereafter, excess pressures above said maximum in the pressure chamber have no effect. The gage will be actuated to indicate only its maximum pressure and be protected against injury. When the applied pressure falls below the gage maximum, the gage will resume indications thereof.

By this means also, sudden peaks or surges of applied pressure at values above the gage maximum cannot injure either the diaphragm or the gage.

The invention also comprises improved means for forming the corrugations on the diaphragm to exactly fit and mate with the corrugations on the said concave wall surface.

The invention comprises improved means by which all air may be excluded from the connection between the gage and the gage chamber and a solid filling of gage liquid provided therein.

Other objects of the invention are to provide a connection of the class referred to having the improvements in structure and mode of operation mentioned in the foregoing general description of the invention.

Still other objects will occur to those skilled in the art as a description of embodiments of the invention hereinafter proceeds.

The actual invention is that set forth in the appended claims.

The invention is fully disclosed in the following description taken in connection with the accompanying drawing in which, Fig. 1 is a sectional view of a preferred embodiment of the invention showing a number of the features referred to hereinbefore;

Figure 3:
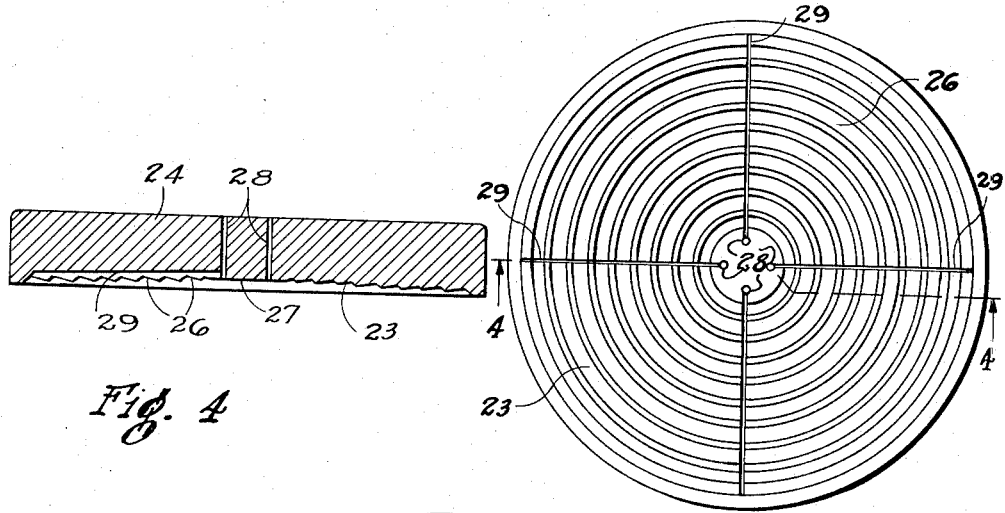
Fig. 3 is a bottom plan view of an insert shown in Figs. 1 and 2, but to enlarged scale; and, Fig. 4 is a sectional view from the plane 4—4 of Fig. 3.

Referring to the drawing, Fig. 1, there is shown an upper housing part 10, a lower housing part 11, and an intermediate ring form housing part 12. The lower part 11 is clamped upon the part 12 by a circular series of screws 13, and sealed thereon by a gasket 14; and has a central pipe threaded opening 15 therethrough, into which is screwed a conduit 16 coming from some system or apparatus and containing liquid or gas the pressure of which is to be indicated, and communicating the pressure to the interior of the ring part 12 which interior may be considered as an applied pressure chamber 18.

The upper part 10 is clamped upon the upper side of the ring part 12 by a circular series of screws 17 with a circular diaphragm 19 therebetween, having an annular planar peripheral portion 20 to seal the juncture of the parts 10 and 12, and a circular periphery abutting a shoulder 20A on the part 10 to position the diaphragm radially.

The diaphragm 19 is made of thin planar sheet metal and has therein a plurality of circular, concentric, corrugations 21 extending uniformly both above and below the diaphragm plane, which makes its central portions flexible, sensitively, to variations of pressure on it. At the center is a circular uncorrugated area 22.

The upper part 10 is provided with a transverse wall surface 23 above the diaphragm 19 upon which the diaphragm engages and is stopped when flexed a predetermined maximum amount; and this wall surface has particular characteristics involving a part of the invention as follows.

While this wall surface 23 could be formed on the material of the upper part 10, preferably, to facilitate manufacture, it is formed on an insert 24 made from die cast metal, seated in a recess 25 of the upper part 10, and fitted therein to retain it.

Figure 4:
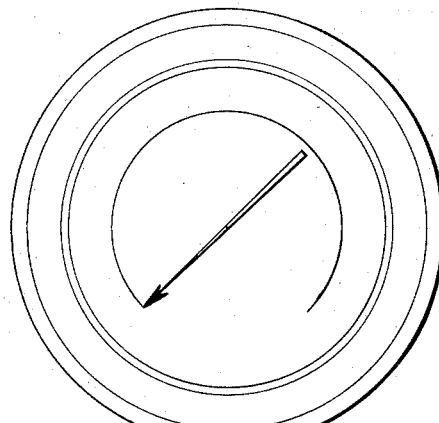

It is shown separately in Figs. 3 and 4.

The insert 24 is a circular disc and the recess 25 is disposed so that the central axis of the disc is coaxial with the circular corrugations 21 of the diaphragm 19, positioned radially as referred to. The said surface 23 at the peripheral portion of its underside, is planar and fits upon the outer uncorrugated planar part 20 of the diaphragm 19, and, opposite the diaphragm corrugations 21, has concentric circular insert corrugations 26; and opposite the planar central area 22 of the diaphragm, has a planar portion 27.

The corrugations 26 and planar portion 27 of the insert surface 23 are formed so that when the diaphragm, in operation, is flexed upwardly by sufficient pressure, the diaphragm and insert corrugations will mate and fit with each other, and the diaphragm central portion 22 will lie flat upon the surface portion 27.

To provide for a predetermined maximum amount of flexure of the diaphragm, the under surface 23 of the insert, as a whole, is concave, or more specifically, frusto-conical. In an illustrative case of a diaphragm having a diameter of about 2.5 inches in its flexible portion, the angle of the cone side with respect to the cone base or plane of the diaphragm, may be about 2 degrees, and this will allow about 1/32" maximum upward flexing movement at its center.

The space between the unflexed diaphragm and the said surface 23 will be seen to be the aforesaid gage chamber and may be designated as 57.

Extending axially through the insert 24 and opening inwardly in the central planar portion 27 of the surface 23, is a plurality, preferably four, of capillary size ducts 28—28, Figs. 1, 3, and 4.

At several points in the surface 23, preferably four, are narrow slits 29—29, extending radially from the ducts 28—28, and opening axially into all of the corrugations 26—26 of the said surface 23, but closed at their radially outer ends, Figs. 3 and 4.

At the top of the housing part 10 is a hole 30 communicating with all of the said ducts 28 and its outer end is pipe threaded to receive the threaded end of a union nipple 31, having a wrench receiving portion 42 for screwing it in. The nipple has a duct 32 in its larger than capillary diameter opening at its lower end into the hole 30; and enlarged at its upper end as at 33 to provide a cylinder 33 which is of predetermined volume for a purpose to be described.

At 34 is a union body having on its lower end a piston 35 in the cylinder 33. The piston 35 has a piston ring 41 of rubber to seal it upon the wall of the cylinder 33. Above the piston, the body is of enlarged diameter to provide a shoulder 36 engaging the top of the nipple 31, and has threads 37 thereon.

The nipple 31 has an external shoulder 38 near its upper end.

A union nut 39 engaging the shoulder 38 and screwed on the threads 37 draws the shoulder 36 tight upon the end of the nipple; and a rubber ring 40 makes a pressure proof seal thereat.

Axially within the union body 34 at its upper portion, is a large diameter hole 43, the upper end of which is threaded to receive the threaded stem 44 of the gage 45; and the interior of the stem, at least at its lower end, is of capillary size as at 46.

At the lower end of the hole 43 it communicates with a capillary duct 47 extending all the way downwardly through the piston 35.

At the top of the body 34 it has a wrench receiving portion 42A.

Communicating with the hole 43 in the body 34, is a pipe threaded hole 48 into which is screwed a tubular housing 49 having therein a cylinder 50, outwardly enlarged and threaded as at 51. The cylinder 50 communicates with the hole 43 by a capillary duct 52.

A piston 53, in the cylinder 50, has, outwardly, an enlarged head 54, threaded on the threads 51, with a slot 55 for turning it. The piston 53 is sealed in the cylinder 50 by a rubber piston ring 56.

Operation of the parts of Fig. 1 will now be described, including a procedure for assembling the parts.

*Assembly and operation*

In assembling the aforesaid connections, the insert 24 is put into its recess 25; and the housing part 10, diaphragm 19, housing parts 12 and 11 are clamped together as described.

The main applied pressure conduit 16 is not at this time connected to the housing part 11; and, instead, the chamber 18 is connected, by a pipe (not shown) screwed into the threaded hole 15, to a source of air pressure, of a few pounds per square inch, sufficient to flex the diaphragm upwardly into the said intimate mating engagement with the said surface 23 of the insert.

An exhausting and filling apparatus comprising a sealed vessel partly filled with gage liquid, chosen as hereinbefore referred to, and having the space above the liquid connected to a vacuum pump is provided; and the liquid is communicated through a sealed conduit connection with the upper end of the nipple 31. The vacuum pump draws or exhausts air through the liquid in the vessel from the gage chamber 57 between the diaphragm and the surface 23, and from the ducts 28, slits 29, hole 30, duct 32 and cylinder 33. Any air trapped in the insert corrugations 26 is drawn out through the slits 29 and ducts 28 communicating therewith; this being one purpose of the slits.

When exhaust is completed the vacuum is interrupted and gage liquid flows from the filling apparatus vessel into the said exhausted parts, including the ducts 28 and slits 29 (this being another purpose of the slits) and rises in the ducts 28 into the hole 30 etc. thereabove; thus making a solid filling of gage liquid from the top of the diaphragm to the top of the nipple cylinder 33. The filling and exhausting apparatus is then disconnected from the nipple 31.

While it is possible for gage liquid to flow or be spilled out of the nipple cylinder and duct 32 in handling, it cannot flow out of the ducts 28 because of their capillary size, and the spilled liquid can be replaced manually; so that a solid air-free filling with gage liquid to the top of the nipple is provided for.

The body 34 is at this time assembled with the gage stem 44 and housing 49, but not with the nipple 31. The exhausting and filling apparatus is connected to the lower end of the piston 35, and, as described above, the gage, hole 43, ducts 47 and 52 and cylinder 50 are filled solid with gage liquid all the way to the end of the capillary duct 47 and after the exhausting and filling apparatus is disconnected, is retained by the capillary duct 47.

The filling in the cylinder 50 is retained by the capillary duct 52.

Such exhausting and filling apparatus being known it is deemed unnecessary to illustrate or further describe it herein.

The lower end of the piston 35 on the body 34 is now presented to the upper end of the cylinder 33 in the nipple 31 and pushed downward in the cylinder in which it is sealed as described, and at the same time the said air pressure on the under side of the diaphragm is released. The descending piston 35 displaces liquid through the duct 32, hole 30, ducts 28 and slits 29, and upon the top of the diaphragm 19 and the diaphragm is moved downwardly from its flexed position.

It is desired to have the diaphragm flex downwardly until it is in a neutral or unflexed condition; and to this end the volume of liquid displacement in the nipple cylinder 33 is predetermined by dimensions of the parts, so that when the body cylinder 35 has been moved all the way down and its shoulder 36 engages the top of the nipple, the diaphragm will be in that condition.

The nut 39 is now screwed on tight to hold the body 34 and nipple 31 together; and before it comes tight, the body 34 and gage 45 may be rotated to cause the dial of the gage to face in any desired direction.

From the foregoing, it will be seen that the construction provides for the liquid in the expansible and contractible element of the gage to be part of an uninterrupted, air free, solid filling of gage liquid, all the way from the gage to the filled gage chamber 57, above the diaphragm.

The above described connection assembly may now be installed for use by connecting the applied pressure chamber 18 to the pipe 16 at 15.

Applied pressure will flex the diaphragm 18 upwardly more or less and cause corresponding indications on the gage up to the maximum scale indication on the gage which may, in an illustrative case, be 200 pounds per square inch of pressure.

The diameter of the diaphragm and the angular inclination of the frusto conical surface 23 may be preselected so that when the applied pressure reaches said 200 pounds, the diaphragm will be in intimate contact with said surface.

Any excess of pressure above 200 pounds cannot damage the diaphragm corrugations by mashing them as referred to hereinbefore, because they are at all points backed up by the insert corrugations with which they mate; and excess pressure cannot force the center of the diaphragm into the holes 28 nor into the slits 29 and thereby rupture it, because they are so small in size.

The gage, and any of the said connections to it, therefore, can at any time with impunity be removed for inspection, adjustment, repairs etc., while pressure, even excess pressure, is being applied, without damage to the diaphragm because the diaphragm will then be flexed into intimate contact with the surface 23 in the manner above described. Also, peaks or surges of applied pressure above 200 pounds and likewise development of a leak in in the gage, is prevented in like manner from injuring the diaphragm.

Whether the pressure operated device is a pressure indicating gage, as herein chosen for description purposes, or some other kind of pressure operated device, it will usually comprise an expansible and contractible pressure chamber into which the diaphragm by upward flexing displaces operating liquid.

When the device is a gage of the Bourdon tube class, a small quantity of displaced liquid is enough to actuate the gage over its full indicating range.

Other kinds of devices, for example those having a bellows chamber require more displaced liquid.

The diameter of the diaphragm; and the maximum flexing of which it is capable without permanent distortion or too much inherent spring action; and the consequent inclination angle of the surface 23, can all be predetermined in a manner known to those skilled in the art to adapt the invention to any kind or size of pressure operated device.

In some cases, when the device is a gage, it may be desirable to install a diaphragm and connections as described, which will flex the diaphragm into contact with the surface 23 at some definite pressure, say 200 pounds, when the pressure applying system is one in which the maximum pressure at any time is never greater than 100 pounds, as an illustrative example.

In such a case the diaphragm would never be flexed into contact with the surface in normal operation. But upon removing the gage or upon development of a leak in the gage, the diaphragm would be protected against injury as aforesaid by being then flexed into contact with the surface 23.

Again, when the diaphragm has been moved to neutral unflexed condition (as described) at the time of installation, and when the diaphragm etc. are designed as referred to so that the diaphragm will be flexed into contact with the surface 23 at some pressure greater than 200 pounds, there may be instances in which it is desirable to use a gage whose maximum indication is only, say, 200 pounds, regardless of what maximum the applied pressure may rise to.

In such a combination, a rise of pressure above 200 pounds, would flex the diaphragm without injury to it, but would damage the gage by forcing it beyond its maximum operating range.

In such cases, the diaphragm may be further adjusted, so that it will contact the surface 23 at 200 pounds applied pressure to protect the gage.

This may be done by adjusting the position of the piston 53 in the cylinder 50. Retracting the piston will subtract some of the gage liquid, from the connections, and therefore from the gage chamber 57.

This makes the normal position of the diaphragm a flexed position above its neutral unflexed position.

As the applied pressure rises toward 200 pounds, the gage indication will increase toward 200 pounds, and by the time the diaphragm has displaced enough gage liquid into the gage to make it read 200 pounds, the diaphragm will have come into contact with the surface 23 and be stopped thereon, regardless of how much higher the applied pressure may rise; and thus it cannot displace more liquid into the gage to damage it.

There are installations of gages that are subjected to ambient temperatures higher than the ordinary room temperature at which the gage and connections were assembled.

The gage liquid is chosen as aforesaid for optimum operating characteristics, and will be one having the minimum of expansion and contraction with change of temperature.

However there may be nevertheless some "thermometer action" at elevated temperatures, that is, the gage liquid will expand so that if the diaphragm had a neutral unflexed position at room temperature it will be flexed below that position.

In the foregoing the flexing of the diaphragm upwardly by pressure to move it into contact with the surface 23 for the purposes described, begins from a selected normal position of the diaphragm, unflexed or upwardly flexed, which it has when the applied pressure is at zero value.

It will be apparent that if the normal position of the diaphragm is below said selected position due to elevated ambient temperatures, it will have to be flexed upwardly a greater distance to contact the surface 23, and in doing so will displace correspondingly a greater amount of liquid into the gage; resulting in some cases in inaccurate gage readings, and in other cases in loss of protection to the gage by forcing it beyond its indicating range.

The invention as described comprises means in the adjustable piston and cylinder 53—50, to compensate for these effects of ambient temperature.

When the diaphragm is in an abnormally low flexed position due to ambient temperature, the piston 53 can be adjustably retracted to restore the diaphragm upwardly to its said selected normal position, in the manner already described for this piston and cylinder.

The lower housing part 11 may be detached at any time by the screws 13—13 to clean out the chamber 18 if material in the conduit 16 should accumulate therein, without disturbing the clamped assembly of the diaphragm 19.

Figure 2:
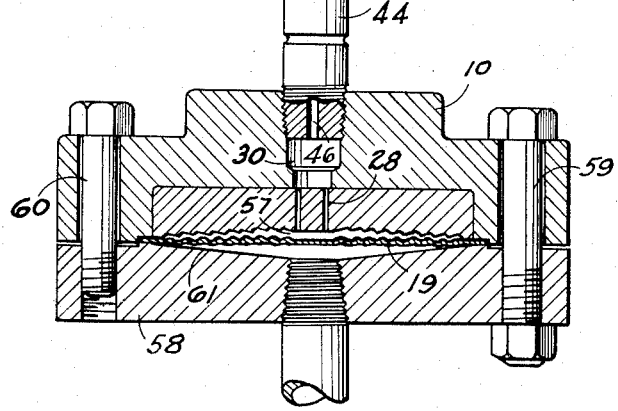
Fig. 2 is a sectional view of an embodiment similar to that of Fig. 1, but in simplified form, omitting some of the features thereof for cases wherein they are not wanted.

In Fig. 2 is shown a simplified embodiment of the invention which in some cases may be utilized when all of the features of improvement of Fig. 1 are not wanted.

Here a lower housing part 58 is clamped directly upon the upper housing part 10 with the diaphragm 19 therebetween, by through bolts 59 or screws 60; and is concave on its inside as at 61 to provide the applied pressure chamber.

The construction of the insert 24 and diaphragm 19 is the same as in Fig. 1, and the upper part 10 has the threaded hole 30 of Fig. 1.

Here the gage stem 44 is to be screwed directly into the hole 30.

The gage chamber 57, ducts 28 and hole 30 are evacuated and filled solid with gage liquid, by the exhausting and filling apparatus as described for Fig. 1, and the filling apparatus is detached. The liquid in the hole 30 is then caused to be at a predetermined level, or predetermined measured distance from the top of the part 10.

The gage is likewise evacuated and filled solid with liquid to the end of the capillary duct 46 in its stem 44, the duct retaining the filling.

The diaphragm is held against the surface 23 by air pressure on its underside as described for Fig. 1 and the pressure is relieved when the stem 44 is screwed into the hole 30.

When the stem 44 is screwed into the hole 30, the said level of liquid in the hole 30 will be contacted by the end of the stem maintaining the filling air free. Some liquid may escape outwardly through the threads before they seal. Thereafter as the stem is screwed in tight, it displaces liquid from the hole 30 into the diaphragm chamber 57.

The diameter of the hole 30 and gage stem 44 and level of liquid in the hole 30 are predetermined with respect to the volume of the gage chamber 57, so that as the stem is screwed into a final position, it will displace liquid from the hole 30 into the gage chamber to flex the diaphragm as described for Fig. 1, into its normal working position.

The operation of this form is the same as that of Fig. 1 in the protection of the diaphragm and the gage from damage; but differs therefrom in that the amount of liquid displaced into the gage chamber and the selected normal position for the diaphragm is not as accurately determined as it is in Fig. 1; and that the features of operation and adjustment provided by the piston and cylinder 50—53 and the features of rotational adjustment of the gage dial have been omitted.

What is claimed is:

1. A connection for connecting a source of fluid pressure to a gage of the Bourdon tube type having a tubular gage stem for indicating the pressure of the fluid, comprising: a walled housing divided into a walled gage chamber and a walled pressure chamber by a flexible diaphragm; a wall of the gage chamber having a surface spaced from one face of the diaphragm; means for effecting communication of source fluid under pressure to the pressure chamber to subject the other face of the diaphragm to the pressure to flex the diaphragm; the diaphragm provided with a plurality of concentric corrugations and the said wall surface provided with a corresponding plurality of corrugations with which the corrugations of the diaphragm will make intimate mating contact upon flexure of the diaphragm by said pressure; a passageway through the gage chamber wall, its inner portion being of capillary diameter and opening into the gage chamber at said surface and its outer portion being of larger diameter; a nipple with a duct therethrough axially, communicating at one end with the outer portion of the passageway and having an open cylinder in its outer end; a body having a piston projected a predetermined distance into said cylinder, and means coupled to the end of the cylinder wall for securing said piston in said projected position; the body having a bore therethrough axially, of capillary diameter at its inner end portion and outwardly being of enlarged diameter; the tubular gage stem communicating with the outer end of the bore whereby the gage connection may be assembled by filling the nipple and its duct and the passageway and gage chamber with liquid to the top of the cylinder, and by filling the body bore and its enlarged diameter portion and the tubular stem and gage with liquid to the end of the piston, and by flexing the diaphragm into engagement with the gage chamber surface by pressure applied on the said other face of the diaphragm in the pressure chamber, and then projecting the piston into the cylinder to its predetermined projected position and thus displacing into the gage chamber a predetermined quantity of liquid that moves the diaphragm to a normal non-flexed position.

2. A connection for connecting a source of fluid pressure to a gage of the Bourdon tube type having a tubular gage stem for indicating the pressure of the fluid, comprising: a walled housing divided into a walled gage chamber and a walled pressure chamber by a flexible diaphragm; a wall of the gage chamber having a surface spaced from one face of the diaphragm; means for effecting communication of source fluid under pressure to the pressure chamber to subject the other face of the diaphragm to the pressure to flex the diaphragm; a passageway through the gage chamber wall, its inner portion being of capillary diameter and opening into the gage chamber at said surface and its outer portion being of larger diameter; a nipple with a duct therethrough axially, communicating at one end with the outer portion of the passageway and having an open cylinder in its outer end, a body having a piston projected a predetermined distance into said cylinder, and means coupled to the end of the cylinder wall comprising a threaded coupling nut for securing said piston in said projected position; the body having a bore therethrough axially, of capillary diameter at its inner end portion and outwardly being of enlarged diameter; the tubular gage stem communicating with the outer end of the bore whereby the gage connection may be assembled by filling the nipple and its duct and the passageway and gage chamber with liquid to the top of the cylinder, and by filling the body bore and its enlarged diameter portion and the tubular stem and gage with liquid to the end of the piston, and by flexing the diaphragm into engagement with the gage chamber surface by pressure applied on the said other face of the diaphragm in the pressure chamber, and then projecting the piston into the cylinder to its predetermined projected position and thus displacing into the gage chamber a predetermined quantity of liquid that moves the diaphragm to a normal non-flexed position.

3. In combination with a fluid pressure indicating gage of the Bourdon tube type having a tubular stem, a walled housing, a flexible diaphragm, dividing the housing into a walled gage chamber and a walled pressure chamber; a wall of the gage chamber having a surface spaced from one face of the diaphragm; means by which source fluid pressure may be communicated to the pressure chamber to subject the other face of the diaphragm to the source pressure to flex the diaphragm; a passageway through the gage chamber wall, opening into the gage chamber at said surface and its outer portion being of enlarged diameter and constituting a passageway entrance; a connection between the gage stem and the passageway entrance comprising a first and a second part, each having a duct therethrough; the first part connected to the housing at said entrance with its duct communicating therewith and extending therefrom and terminating in a fluid cylinder; the second part connected to the tubular gage stem with its duct in communication therewith and extending therefrom and terminating in a piston; the piston being projectible into the cylinder; whereby before the piston is projected into the cylinder the cylinder and the duct of the first part and the entrance and gage chamber, and the gage tube and tubular stem and the duct in the second part may be filled with gage liquid, and after pressure has been communicated to the pressure chamber and the diaphragm has been flexed thereby into contact with said surface; and whereby upon then projecting the piston into the cylinder, and relieving pressure from the pressure chamber, gage liquid in the cylinder will be displaced into the gage chamber and move the diaphragm in the unflexed direction; means to stop projection of the piston in the cylinder when the diaphragm has moved to a normal unflexed position; and means to couple together the two parts in sealed relation after projection of the piston to its stopped position.

References Cited in the file of this patent

UNITED STATES PATENTS

| | | |
|---|---|---|
| 1,753,469 | Melas | Apr. 8, 1930 |
| 1,772,188 | Mason | Aug. 5, 1930 |
| 1,832,380 | Goldman | Nov. 17, 1931 |
| 2,385,382 | Samiran | Sept. 25, 1945 |
| 2,641,742 | Wolfe et al. | June 9, 1953 |

FOREIGN PATENTS

| | | |
|---|---|---|
| 688,097 | Germany | Feb. 12, 1940 |
| 578,632 | Great Britain | July 5, 1946 |
| 1,023,150 | France | Dec. 24, 1952 |